United States Patent
Ruckart et al.

(10) Patent No.: US 6,606,377 B2
(45) Date of Patent: Aug. 12, 2003

(54) METHOD AND SYSTEM FOR ANALYZING AND PREPARING AN OPTIMUM TELEPHONE SERVICES CALL PLAN

(75) Inventors: John P. Ruckart, Atlanta, GA (US); Mike Pacifico, Duluth, GA (US); Dirk S. Henson, Alpharetta, GA (US); Ray Rauba, Roswell, GA (US); Allan J. Lenio, Alpharetta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/888,872

(22) Filed: Jun. 25, 2001

(65) Prior Publication Data

US 2002/0196919 A1 Dec. 26, 2002

(51) Int. Cl.[7] .............................................. H04M 15/00
(52) U.S. Cl. .............................. 379/121.02; 379/114.06; 379/114.12
(58) Field of Search ........................ 379/121.02, 114.03, 379/114.06, 114.12, 114.1, 112.01–112.1, 111, 115.01–115.03

(56) References Cited

U.S. PATENT DOCUMENTS

| | | | | |
|---|---|---|---|---|
| 5,553,131 A | * | 9/1996 | Minervino et al. | 379/114.01 |
| 5,659,601 A | * | 8/1997 | Cheslog | 379/119 |
| 5,920,613 A | * | 7/1999 | Alcott et al. | |
| 6,052,447 A | * | 4/2000 | Golden et al. | 379/114.1 |
| 6,052,449 A | * | 4/2000 | Chavez, Jr. | |
| 6,125,173 A | * | 9/2000 | Jagadish et al. | 379/114.1 |
| 6,301,471 B1 | * | 10/2001 | Dahm et al. | 379/114.1 |
| 6,337,901 B1 | * | 1/2002 | Rome et al. | 379/112.01 |

* cited by examiner

Primary Examiner—Duc Nguyen
Assistant Examiner—Barry W Taylor

(57) ABSTRACT

A method and system are provided for analyzing and preparing optimum telephone services calling plans. An optimum calling plan analysis engine analyzes wireline local and long distance and wireless call use during a given period of time for selected wireline and wireless telephone services. Based on a number of factors, including the type, duration, time, day, location, etc. of calls made by the subscriber, the calling plan engine calculates the cost of a number of different calling plans to which the subscriber may change in order to offer a cost savings to the subscriber. After the calling plan engine calculates and identifies alternative calling plans that meet the subscriber's calling patterns and save costs to the subscriber, the subscriber is notified of the alternative calling plans.

12 Claims, 4 Drawing Sheets

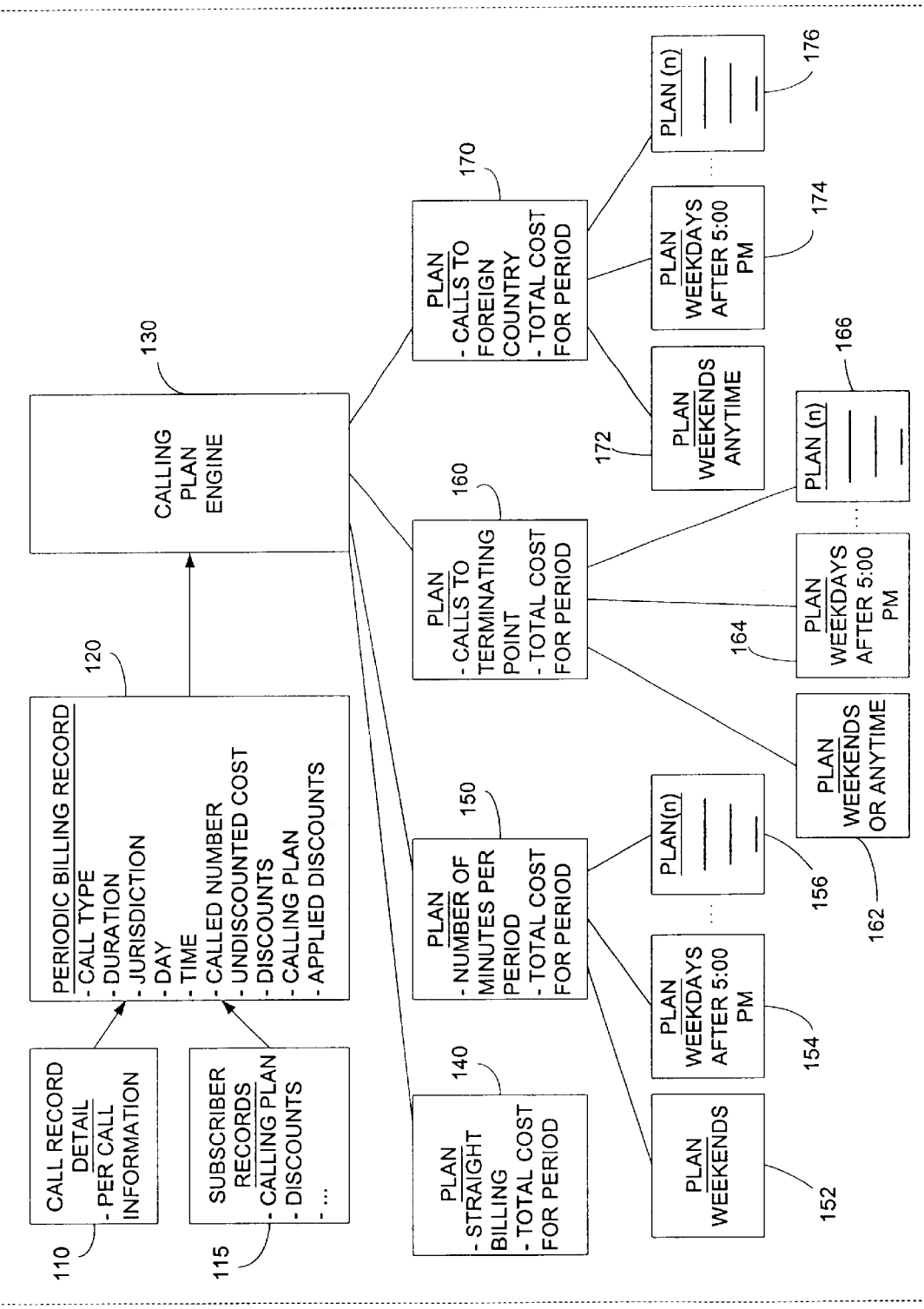

METHOD AND SYSTEM FOR ANALYZING AND PREPARING AN OPTIMUM TELEPHONE SERVICES CALL PLAN

FIELD OF THE INVENTION

This invention relates generally to the analysis and preparation of customer service based calling plans for wireline and wireless telephone services.

BACKGROUND OF THE INVENTION

A wide range of telecommunication services including local area and long distance wireline and a variety of wireless telephone services are increasingly available and are being utilized by a wide range of telephone service subscribers for work, education, recreation, and the like. In order to remain competitive, providers of telecommunications services offer a number of calling plans designed to allow subscribers to make the most efficient use of telecommunications services. For example, a telecommunications service provider may offer a calling plan that dramatically reduces the rates charged for long distance wireline telecommunications services if the subscriber makes all calls on the weekends or on weekdays after 5:00 PM. If a subscriber makes regular and frequent long distance telephone calls to a particular terminating point in a foreign country, the subscriber's telecommunications service provider may have a calling plan that will reduce calling charges to that particular foreign country. In the wireless setting, telecommunications service providers typically offer a wide range of calling plans based on elapsed duration of wireless telephone calls and based on the time of day and day of the week during which calls are made.

Often, subscribers to telecommunications services subscribe to a basic calling plan and then develop calling patterns that are inefficient relative to the subscriber's calling plan. Or, the subscriber may select a calling plan for a set number of minutes of calls during a given period, but the subscriber far exceeds that number of pre-selected minutes. Or, the caller may select a calling plan that is good for the caller's calling patterns, but the telecommunications service provider may develop and implement a better calling plan at a later time period.

Accordingly, there is a need in the art for a method and system of monitoring a subscriber's use of telecommunications services on a periodic basis and calculating the cost associated with a variety of different calling plans that may be offered to the subscriber to reduce the subscriber's cost for telecommunications services.

It is with respect to these considerations and others that the present invention has been made.

SUMMARY OF THE INVENTION

In accordance with the present invention, the above and other problems are solved by a method and system for analyzing and preparing optimum telephone services calling plans. An optimum calling plan analysis engine analyzes wireline local and long distance and wireless call use during a given period of time for selected wireline and wireless telephone services. Based on a number of factors, including the type, duration, time, day, location, etc. of calls made by the subscriber, the calling plan engine calculates the cost of a number of different calling plans to which the subscriber may change in order to offer a cost savings to the subscriber. After the calling plan engine calculates and identifies alternative calling plans that meet the subscriber's calling patterns and save costs to the subscriber, the subscriber is notified of the alternative calling plans.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention, as claimed.

BRIEF DESCRIPTION OF THE DRAWINGS

FIG. 2 is a block diagram illustrating the system architecture of an exemplary embodiment of the present invention.

DETAILED DESCRIPTION OF THE PREFERRED EMBODIMENT

In accordance with an exemplary embodiment of the present invention and method and system for analysis and preparation of an optimal telephone services calling plan are provided. Call detail records for calls on a per call basis both in the wireline local and long distance setting and any wireless setting are assembled at a telecommunications service provider billing system for preparation of periodic billing to a subscriber. An optimal calling plan analysis engine (hereafter "calling plan engine or CPE") analyzes wireline and wireless call usage of a given subscriber during a given period of time for selecting wireline and wireless telephone services. Based on a number of factors, including the type, duration, time, day, termination point, etc. of calls made by the subscriber, the calling plan engine calculates the cost of a number of different calling plans to which the subscriber may change in order to offer cost savings to the subscriber. Other factors utilized by the calling plan engine include subscriber information, such as existing calling plan, discounts to which the subscriber is entitled, and the like. After the calling plan engine calculates and identifies alternative calling plans that meet the subscriber's calling patterns and save costs to the subscriber, the subscriber is notified of the alternative calling plans.

The present invention is advantageous in enhancing customer service and increasing customer loyalty to telecommunications service providers. For example, if the telecommunications service provider develops and implements a new calling plan that will meet the requirements of the subscriber while saving the subscriber money, the telecommunications service provider can build valuable good will by notifying the subscriber of the benefits of the new calling plan. If the subscriber commences a certain calling pattern such as calling a friend or relative on a regular basis in a specified location such as the location of a friend's college, a telecommunications service provider may be able to provide a calling plan that will save on costs associated with frequent calls made to that particular call terminating point. Additionally, the method and system of the present invention may be used to offer discounts retroactively for valued subscribers. That is, the subscriber's call patterns may be monitored, and if the calling plan engine calculates that the subscriber has paid more in an immediate past calling period than the subscriber would have paid under an alternate calling plan, the telecommunications service provider may offer a retroactive discount to enhance subscriber satisfaction, loyalty and good will.

Exemplary Operating Environment

Figure 1:
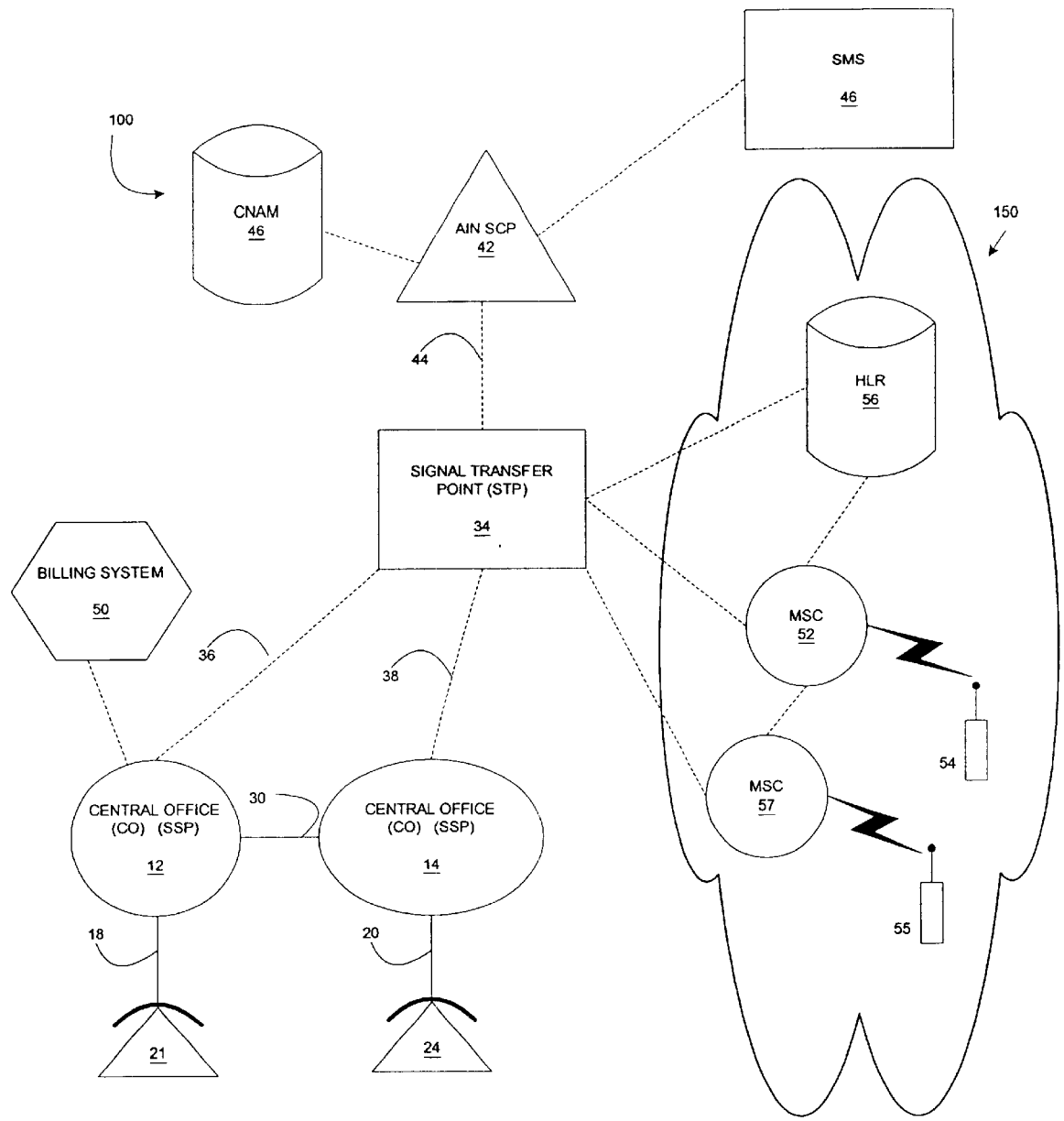
FIG. 1 is a block diagram illustrating components of a wireline and wireless telephone network that provides an exemplary operating environment for the present invention.

It is advantageous to describe an exemplary operating environment in which the current invention may reside to analyze optimum calling plans for both wireline and wireless customers. FIG. 1 is a block diagram illustrating components of a wireline and wireless telephone network that provides an exemplary operating environment for the present invention. Referring now to the drawings, in which like numerals represent like elements throughout the several figures, aspects of the present invention and the advanced intelligent network (AIN) and an integrated wireless network will be described.

The public switched telephone network that evolved in the 1980s incorporated the advanced intelligent network (AIN). Some of the components of the advanced intelligent network are illustrated in FIG. 1. FIG. 1 is a block diagram representing at least a part of the advanced intelligent network (AIN) 100 of a typical local exchange carrier integrated with components of a wireless network 150. The advanced intelligent network (AIN) uses the signaling system 7 (SS7) network for signal or system control message transport. The components thereof are well-known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

A plurality of central offices are provided in a typical public switched telephone network. As shown in FIG. 1, each central office may include an electronic switch known to those skilled in the art as a service switching point (SSP). These are indicated in FIG. 1 as SSP switches 12 and 14. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as trunk circuits 30 and 32.

As shown in FIG. 1, central offices switches (SSP) 12 and 14 have a plurality of subscriber lines 18 and 20 connected thereto. Each of the subscriber lines 18 and 20 is connected to a terminating piece or pieces of customer premises equipment that are represented by telephones 21 and 24. SSP switches 12 and 14 are connected by a plurality of trunk circuits 30. These are the voice path trunks that interconnect the central offices 12 and 14 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 1.

Much of the intelligence, and the basis for many of the enhanced features of the network, resides in the local AIN service control point (SCP) 42 that is connected to signal transfer point 34 via SS7 data link 44. As is known to those skilled in the art, AIN service control points, such as AIN SCP 42, are physically implemented by relatively powerful fault tolerant computers. Among the functions performed by the service control points is maintenance of network databases used in providing enhanced services.

Additional devices for implementing advanced network functions within the AIN 10 are provided by regional STPs (not shown), regional AIN SCPs (not shown), and a service management system (SMS) 46. The STP 34 is connected to the SSPs via connections 36, 38 and 40. Both the regional AIN SCPs and the local AIN SCP 42, which represent a plurality of local AIN SCPs distributed throughout the AIN 10, are connected via respective data links to the SMS 46. The SMS 46 provides a centralized platform for remotely programming the various AIN SCPs of the AIN 10 so that a coordinated information processing scheme may be implemented for the AIN 10. The SMS 46 is implemented by a large general purpose computer and interfaces to business offices of the local exchange carrier and interexchange carriers. SSPs download, on a non-real time basis, billing information to a billing system 50 that is needed in order to appropriately invoice subscribers for the services provided.

The AIN SCP 42 is also connected to a caller ID with name (CNAM) database 46. The CNAM database comprises a plurality of directory numbers along with associated names for the directory numbers. The CNAM database may be used to provide a look-up database to provide caller ID service. The CNAM database may comprises directory numbers from wireline customers as well as wireless customers of wireless network 150.

In operation, the intelligent network elements of the AIN 100, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP central office switches 12 and 14, a relatively small set of triggers are defined at the SSP central office switches for each call.

For preparation of billing information, the subscriber's telecommunications service provider is generally responsible for maintaining records for both local and long distance wireline and wireless services and producing billing statements for individual subscribers. The billing system 50, otherwise known as a call accounting system, includes computer systems, memory storage, software, and some mechanical methods for connection to the telephone network described with respect to FIG. 1. A billing system 50 is used to record information about the telephone calls, organize that information, and upon being asked, prepare statements related to subscriber use of telephone services. The information recorded or captured about telephone calls includes all information required to prepare periodic billing statements to subscribers for use of telephone services.

Representative information includes type, date, time, duration, originating point and terminating point for telephone calls combined with subscriber information such as calling plan information, discounts provided to a subscriber, and the like.

The billing system 50 produces these billing statements, which are typically mailed to subscribers on a periodic basis. Information may be downloaded from the SSP 12 to the billing system 50 in association with the preparation of the billing statements. The operation of a billing system of a telecommunications service provider, such as the billing system 50, is well-known to those skilled in the art.

It will be appreciated that the billing system 50 may prepare records for each subscriber on a per communication basis. These per communication records for a particular subscriber are typically created by the originating switch that serves the subscriber's line. Preferably, the AIN central office switches, such as SSP 12, create call records detail records (CDR) that contain information on outgoing and incoming phone calls, including originating and terminating parties, originating and terminating destination, time of day, day of the week, duration of the call, type of call (wireline or wireless), and the like. Additionally, the call detail records typically contain call disposition information (e.g. answered, busy, etc.). The per communication call detail records created by the SSP 12 for the subscriber line 18 are periodically downloaded to the billing system 50 on a non-real time basis. The billing system 50 computes the costs for the communications represented by the various records and prepares billing statements to be mailed to the subscribers.

The wireless network 150, such as a cellular network, comprises a mobile switching center (MSC) 52. The MSC 52 is a switch providing services and coordination between wireless user in network 50 and external networks. The MSC 52 may be connected to STP 34 to provide information to the wireline network and receive information from the wireline network. The MSC 52 also communicates with a wireless subscriber, such as wireless telephones 54 and 55. For preparation of billing, the MSCs create call detail records (CDR) similar to the above-described AIN SSPs. The call detail records created by the MSCs are transmitted to the billing system 50 for preparation of periodic wireless subscriber billing.

The MSC 52 may also be connected to a home location register (HLR) 56. The HLR is an SS7 database used to identify/verify a wireless subscriber. The HLR also comprises data related to feature and services the wireless subscriber has. The HLR is also used during roaming to verify the legitimacy of the subscriber and to provide them with their subscribed features. The HLR 56 may also be connected to the STP 34 and/or SCP 42 of the wireline network. In certain embodiments of the present invention, such as when the calling party is a wireless phone customer, the HLR may be used to provide the calling party's name and calling party's number for the caller ID service.

FIG. 2 is a block diagram illustrating the system architecture of an exemplary embodiment of the present invention. As shown in FIG. 2, the call detail record 110 and the subscriber record 115 are utilized in the billing system 50 for creating a periodic billing record 120. According to an exemplary embodiment, the call detail records contains per call information received from the switch 12 each time a subscriber utilizes the telephone services from her telephone 21, as illustrated in FIG. 1. Alternatively, where the subscriber is utilizing wireline services from a wireline telephone set 55, the call detail record will be generated at the MSC 57 and transmitted to the billing system 50. The subscriber record 115 contains information related to the subscriber's telecommunications service plan including the particulars of any calling plans utilized by the subscriber, any discounts provided to the subscriber, and the like.

As is well known to those skilled in the art, on a periodic basis, for example, monthly, the billing system 50 generates a periodic billing record 120 for the preparation of billing to forward to the subscriber for use of the prescribed telecommunications services. Typically, a periodic billing record 120 contains information including the call type, the duration of the call, the jurisdiction of the call, the day and time of the call, the originating number and the called number, the undiscounted cost, any discounts, calling plan and other subscriber information, and any applied discounts. It should be understood, that the periodic billing record 120 may contain other information that is necessary to prepare bills to subscribers for their use of telecommunications services. The jurisdiction of the call includes information regarding the originating point and the terminating point of calls made by the subscriber. The call type may include information, including wireline long distance services, wireless services, calling card calls, assisted calls, etc.

The calling plan engine 130 is a software module containing instructions executable by a computer or other electronic device suitable for analyzing information from the periodic billing record 120 to determine whether other calling plans available to the subscriber will result in lower costs to the subscriber for the prescribed telecommunications services. In accordance with an exemplary embodiment of the present invention, the calling plan engine 130 extracts information from the periodic billing record 120 and calculates the total cost associated with the subscriber's use of telecommunications services during that billing period according to other plans 140, 150, 160 and 170.

For example, as shown in plan 140, the billing plan engine calculates the total cost of the services used according to a straight billing method. That is, a total cost is calculated using no discounts and no particular calling plan. As shown in plan 150, the calling plan engine 130 calculates the total cost according to a calling plan based on the number of minutes per period. As shown in plan 160, the calling plan engine calculates the total cost according to a plan calculated based on calls to certain terminating points. This type of plan might be most efficient to the subscriber where the subscriber frequently and consistently calls a certain terminating point, for example, a city where the subscriber's friend attends college. As shown in the plan 170, the calling plan engine 130 calculates the total cost according to a calling plan that accommodates frequent calls to terminating points located in foreign countries. It should be understood, that the calling plan engine calculates plans such as those illustrated in FIG. 2 based on calling patterns established by the subscriber and shown in the periodic billing record 120. That is, if the subscriber places no calls during the periodic billing period to foreign countries, then necessarily the calling plan engine 130 will not construct a calling plan relating to calls to foreign countries such as the calling plan 170.

Under each of the plans calculated by the calling plan engine 130, such as the plans 150, 160 and 170, the calling plan engine may construct additional alternative calling plans to provide the subscriber with a full range of choices for decreasing the subscriber's cost for telecommunications services. For example, the plans 152, 154 and 156 are variations on the plan 150. For example, plan 152 is a calling plan based on the number of minutes per period during weekends, and plan 154 is a calling plan based on the number of minutes per period during weekdays after 5:00 PM. Plans 162 and 164 likewise create variations on plan 160, and plans 172 and 174 show variations on the plan 170.

It should be understood to those skilled in the art that the calling plans shown in FIG. 2 are illustrative only and are not restrictive of the invention claimed herein. That is, the calling plan engine 130 may construct a wide range of permutations of costs associated with the subscriber's use of telecommunications services relating to calling plans available to the subscriber. For example, a calling plan that is based on a prescribed number of minutes per calling period on weekdays after 5:00 PM, but also including the limitation of calls to a specified terminating point could be constructed as a potential calling plan for the subscriber.

In addition to calculating a number of potential cost saving calling plans, the calling plan engine 130 may extrapolate the total cost for each potential calling plan over a period, such as a year, in order to determine a long term cost savings for the subscriber. On the other hand, if the calling patterns of the subscriber indicate that the subscriber only makes calls to a specific terminating point, such as a college location during seasonal periods, the calling plan engine 130 may construct a calling plan that accommodates for varying and seasonal calling patterns.

After the calling plan 130 calculates the potential cost saving calling plan, a determination is made whether any of the potentially cost saving calling plans meets or exceeds a prescribed threshold of savings, for example five dollars per month, sixty dollars per year, and the like. If the cost savings is so minimal that the administrative costs of changing the subscriber from her current calling plan to a new calling plan outweigh advantages associated with the change, that calling plan will not be included in the potential calling plans offered to the subscriber.

Next, according to a preferred embodiment, among the potential calling plans that meet a prescribed threshold of cost savings, the calling plan engine 130 prioritizes the calling plan offered to the subscriber according to how well those potential calling plans meet the calling patterns of the subscriber. For example, if the subscriber makes the majority of her calls during the weekdays before 5:00 PM, a potential cost saving calling plan that is based on calls made on weekdays after 5:00 PM or on weekends, for example, will not be offered to the subscriber as the optimum alternative calling plan to the subscriber's current calling plan. However, because the subscriber may desire to change her calling patterns once she sees the potential cost savings associated with the change, any such potentially cost saving alternative calling plans may be offered to the subscriber according to an exemplary embodiment of the present invention.

Once a determination is made as to which alternative calling plans to offer the subscriber, the calling plan engine forwards the alternative call plans to the customer relations function of the telecommunications service provider. According to one embodiment, an automated system may be in place where the alternative calling plans are automatically forwarded through written correspondence, electronic correspondence, or telephonic correspondence to the subscriber. According to another embodiment, a human customer service relations operator may contact the subscriber to offer the alternative calling plan. Prior to contacting the subscriber with the alternative calling plans, the customer relations function of the telecommunications service provider, whether automated or manual, may check a customer database to determine the number of times the subscriber has previously been offered a change to the subscriber's current calling plan. If the number of times exceeds a prescribed number, for example three times, the customer relations function may determine that the subscriber is not interested in changing to a different calling plan, and the customer relations function may avoid contacting the subscriber again to avoid annoying the subscriber with an unwanted solicitation.

Additionally, the customer relations function of the telecommunications service provider may provide periodic reports to subscribers showing an analysis of their call patterns and potentially cost saving alternative calling plans. For example, a business subscriber may receive quarterly reports showing call use over the past quarter and illustrating potential savings based on alternative calling plans calculated by the calling plan engine. Illustrations of costs savings may be provide, for example, in graphical or tabular form showing what the savings would have been over the past period under different alternative calling plans and illustrating potential future savings extrapolated out over future calling periods. Alternatively, call usage and potential cost saving alternative plans may be provided to subscribers via an Internet-based web site established by the telecommunications service provider. Cost saving alternative calling plans may be viewed and ordered via the web site or the alternative plans may be electronically mailed to the subscriber.

Figure 3A:
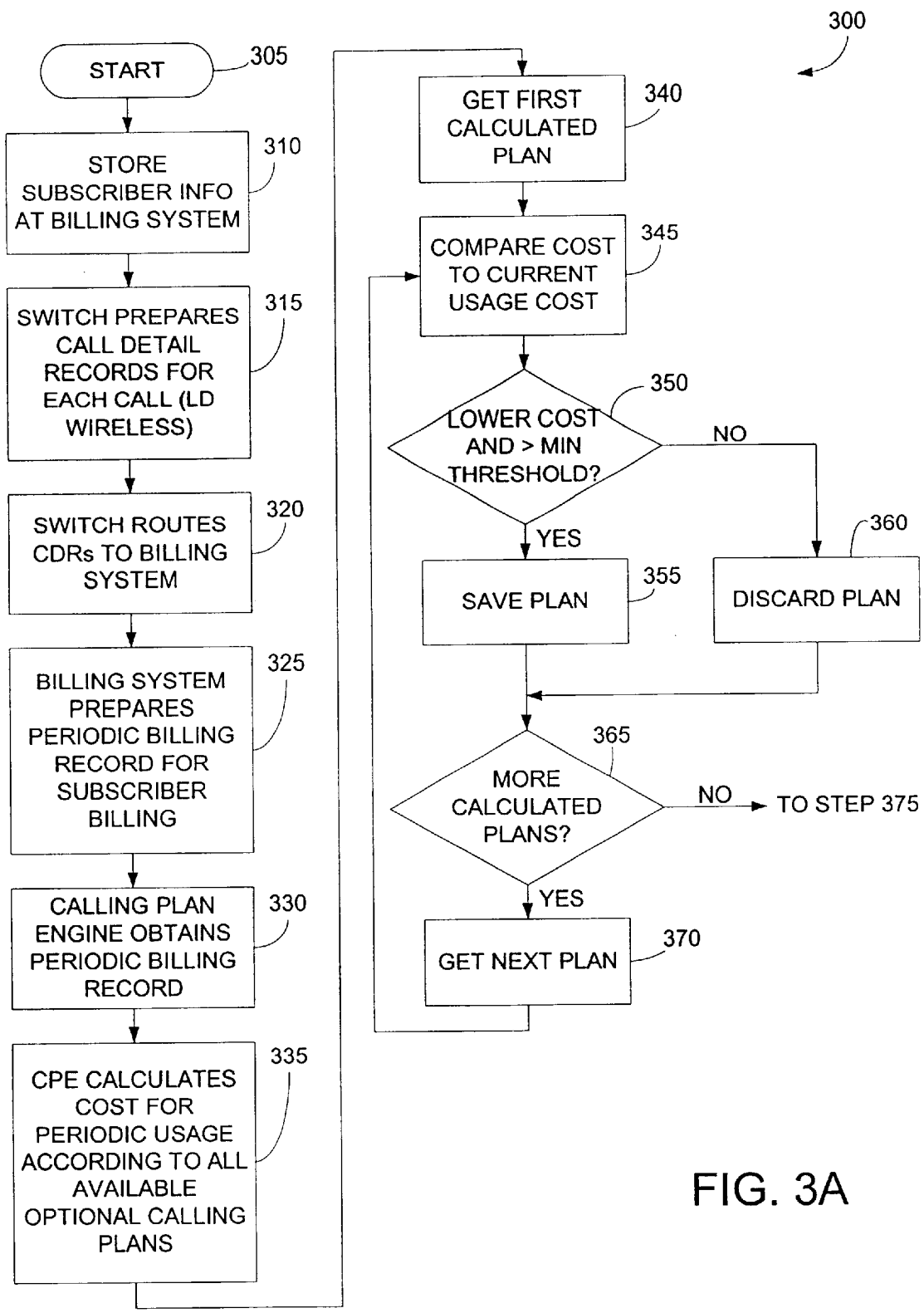
FIG. 3 illustrates an operational flow of the steps performed of a system and method of the present invention in providing optimum calling plan analysis and preparation.
Figure 3B:
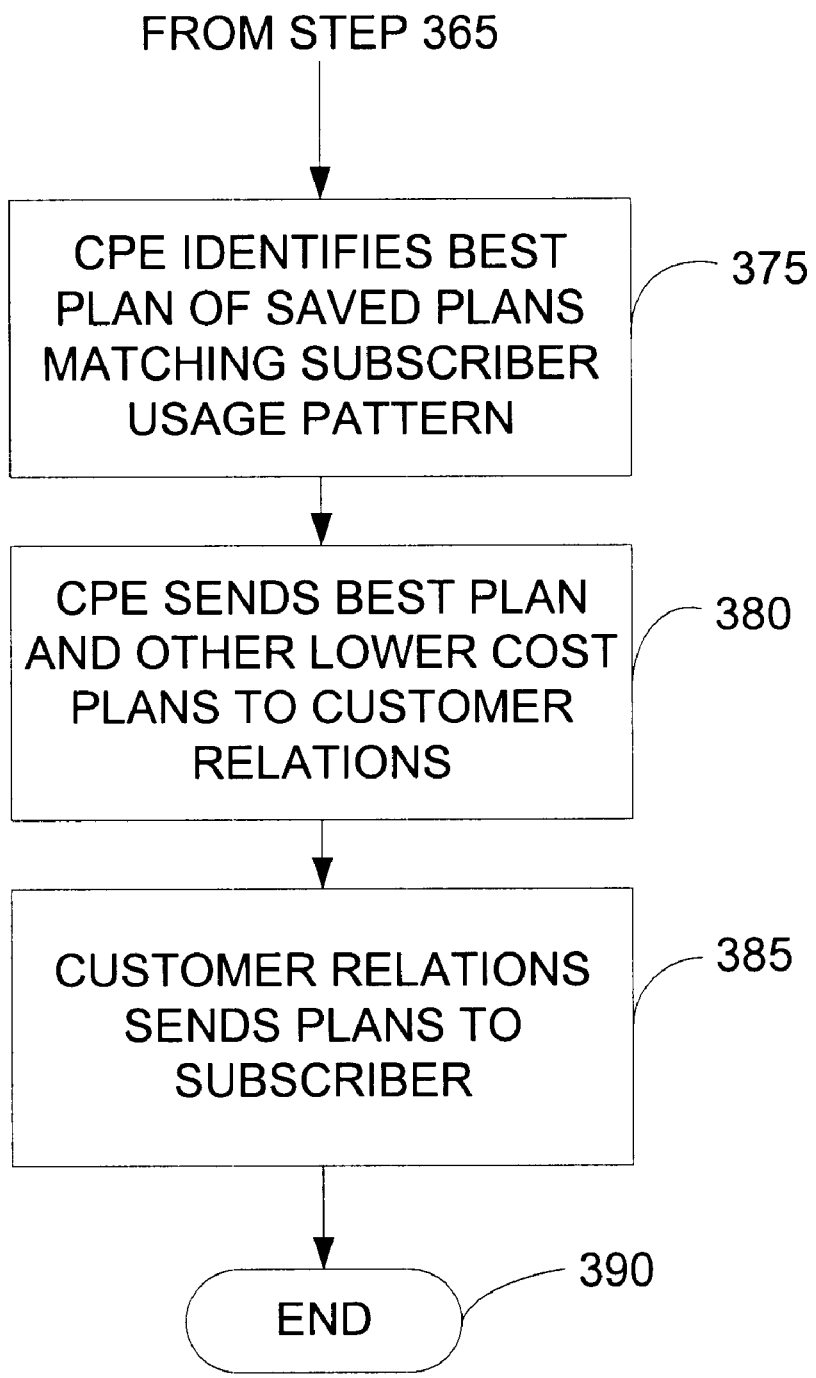

Having described an exemplary operating environment and the system architecture for the present invention with reference to FIGS. 1 and 2, a flow diagram illustrating a method 300 for analyzing and preparing optimum alternative calling plans for subscribers of telecommunication services is described with reference to FIGS. 1, 2 and 3. For purposes of the exemplary call flow, assume, for example, that a subscriber of telecommunications services utilizes wireline long distance services and calls among other locations, a friend in a distant college city on a daily basis during the collegiate academic year.

The method 300 begins at step 305 and moves to step 310 where information on the subscriber such as the subscriber's current billing plan and any discounts or special services provided to the subscriber are stored in the subscriber records 115 of the billing system 50. At step 315, the switch 12 to which the subscriber's telephone 21 is functionally connected, as described above, prepares call detail records for each call made by the subscriber. As should be understood, a call detail record is made for each call whether the call is a local wireline or long distance wireline call, or whether the call is a wireless call made from a wireless handset 54 through an MSC 52, as described with reference to FIG. 1.

At step 320, the switch 12 routes the call detail records to the billing system 50 for subsequent preparation of periodic billing records and bills to be forwarded to the subscriber for the subscriber's use of the telecommunications services. At step 325, the billing system 50 prepares the periodic billing record 120, as described above. At step 330, the calling plan engine 130 obtains data from the periodic billing record 120. According to the present example, the periodic billing record 120 will include the call type, long distance telephone calls, the duration of the long distance calls made by the subscriber, jurisdictional information including the originating points and terminating points of calls, the days and times of the calls, the called numbers and subscriber information including the subscriber's current calling plans and any discounts. According to the present example, information contained in the periodic billing record will indicate a call pattern associated with the subscriber that shows that the subscriber makes frequent and consistent calls to the subscriber's friend at the distant college town during the course of the collegiate academic year.

At step 335, as described above with reference to FIG. 2, a number of calling plans 140, 150, 160 and 170, and a number of sub-plans under each of those plans are calculated according to the calling patterns of the subscriber. The calling plan engine calculates the costs for the periodic usage of the subscriber according to all available optional calling plans that meet the subscriber's calling patterns. That is, because the calling party has no record of calls to foreign countries during the billing period being analyzed by the calling plan engine 130, the calling plan engine 130 will not calculate costs for optional calling plans related to calls to certain foreign countries.

As step 340, the calling plan engine 130 identifies the first calculated alternative calling plan for comparison against the cost of the user's current calling plan. At step 345, the first calculated alternative calling plan is compared to the cost of the user's current calling plan. At step 355 a determination is made whether the first calculated alternative calling plan is a lower cost and is greater than the minimum threshold cost savings before offering the alternative calling plan to the subscriber. If not, the method proceeds to step 360 and the first alternative calling plan is discarded.

If the first alternative calling plan results in a lower cost to the subscriber and exceeds the minimum threshold savings, the method proceeds to step 355 and the first alternative calling plan is saved. At step 365, a determination is made whether any additional alternative calling plans were calculated by the calling plan engine 130. If yes, the method proceeds to step 370 and the next alternative calling plan is identified for comparison against the cost of the subscriber's current calling plan for the billing period in question.

If at step 365, all alternative calling plans calculated by the calling plan engine 130 have been compared to the user's current costs, the method proceeds to step 375, and the calling plan engine identifies the best plan of the saved plans in terms of which plans best match the subscriber's current calling patterns. For example, if the subscriber makes all long distance calls over a wide range of time, but always calls the subscriber's friend at the college town on weekdays after 5:00 PM, the alternative calling plan most closely matching that calling pattern will be offered to the subscriber first. Other cost saving plans that meet the criteria of resulting in a lower cost to the subscriber and having a cost savings greater than the minimum threshold are likewise reviewed against the calling patterns of the subscriber. For example, if one alternative calling plan meets the required cost savings threshold, but consists of a plan requiring the subscriber to make all long distance calls regardless of the termination point on the weekends after 5:00 PM, that calling plan may be offered to the subscriber, but in a lower order relative to other calling plans.

At step 380, the calling plan engine sends the best calling plan and other lower cost plans to the customer relations function of the telecommunications service provider. At step 385, the customer relations functions sends the plans to the subscriber, as described above. The method ends at step 390.

As described herein, a system and method are provided for calculating and preparing alternative calling plans for subscribers of telecommunications services. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of preparing an alternative calling plan for a subscriber of telecommunication services, comprising the steps of:

calculating a cost of an actual subscriber use of telecommunication services during a period of use under an existing calling plan;

calculating a cost of the actual subscriber use according to each of a plurality of alternative calling plans;

comparing the cost of subscriber use according to each of the plurality of alternative calling plans to the actual subscriber use during the period of use under the existing calling plan;

determining whether any of the calculated costs of the actual subscriber use according to each of the plurality of alternative calling plans are less than the cost of the actual subscriber use by at least a predetermined savings threshold during the period of use under the existing calling plan;

notifying the subscriber of the alternative calling plans that cost less than the cost of the actual subscriber use during the period of use by at least the predetermined savings threshold under the existing calling plan if and only if the predetermined savings threshold is greater than administrative costs associated with switching a subscriber to any of the alternative calling plans.

2. The method of claim 1, further comprising the steps of:

monitoring patterns of subscriber use of telephone services; and whereby the step of notifying the subscriber of any of the calling plans, further includes notifying the subscriber of any of the calling plans that meet the patterns of subscriber use of telephone services.

3. The method of claim 2, wherein the step of monitoring patterns of subscriber use of telephone services includes:

obtaining call detail records of calls made by the subscriber during the period of use; and obtaining subscriber calling plan information for calculating a cost of an actual subscriber use of telephone services during a period of use.

4. The method of claim 3, wherein the call detail records and the subscriber calling plan information are obtained from a telecommunications services billing system.

5. The method of claim 1, whereby the step of notifying the subscriber of any of the calling plans, further includes illustrating an amount of potential savings during a period of use.

6. The method of claim 1, wherein the subscriber use of telecommunication services includes wireline long distance services.

7. The method of claim 1, wherein the subscriber use of telecommunication services includes wireless services.

8. A system for preparing an alternative calling plan for a subscriber of telecommunication services, comprising:

a calling plan engine operative
to calculate a cost of an actual subscriber use of telecommunication services during a period of use under an existing calling plan;

to calculate a cost of the actual subscriber use according to each of a plurality of alternative calling plans;

to compare the cost of subscriber use according to each of the plurality of alternative calling plans to the actual subscriber use during the period of use under the existing calling plan;

to determine whether any of the calculated costs of the actual subscriber use according to each of the plurality of alternative calling plans are less than the cost of the the actual subscriber use by at least a predetermined savings threshold during the period of use under the existing calling plan; and to notify the subscriber of the alternative calling plans that cost less than the cost of the actual subscriber use during the period of use by at least the predetermined savings threshold under the existing calling plan if and only if the predetermined savings threshold is greater than administrative costs associated with switching a subscriber to any of the alternative calling plans.

9. The system of claim 8, the calling plan engine being further operative:

to monitor patterns of subscriber use of telephone services; and to notify the subscriber of any of the calling plans that meet the patterns of subscriber use of telephone services.

10. The system of claim 9, the calling plan engine being further operative to obtain from a billing system call detail records of calls made by the subscriber during the period of use; and to obtain from a billing system subscriber calling plan information for calculating a cost of an actual subscriber use of telephone services during a period of use.

11. The system of claim 8, wherein the subscriber use of telecommunication services includes wireline long distance services.

12. The system of claim 8, wherein the subscriber use of telecommunication services includes wireless services.

* * * * *

UNITED STATES PATENT AND TRADEMARK OFFICE
CERTIFICATE OF CORRECTION

PATENT NO. : 6,606,377 B2
DATED : August 12, 2003
INVENTOR(S) : Ruckart et al.

It is certified that error appears in the above-identified patent and that said Letters Patent is hereby corrected as shown below:

<u>Column 11,</u>
Line 10, "cost of the the actual" should read -- cost of the actual --

Signed and Sealed this

Thirtieth Day of March, 2004

JON W. DUDAS
*Acting Director of the United States Patent and Trademark Office*